(12) United States Patent
Boswell et al.

(10) Patent No.: US 11,960,668 B1
(45) Date of Patent: Apr. 16, 2024

(54) CURSOR MANAGEMENT METHODS AND SYSTEMS FOR RECOVERY FROM INCOMPLETE INTERACTIONS

(71) Applicant: HONEYWELL INTERNATIONAL INC., Charlotte, NC (US)

(72) Inventors: Steven Boswell, Phoenix, AZ (US); Sonia Dodd, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/054,367

(22) Filed: Nov. 10, 2022

(51) Int. Cl.
*G06F 3/038* (2013.01)
*B64D 43/00* (2006.01)

(52) U.S. Cl.
CPC ............ *G06F 3/038* (2013.01); *B64D 43/00* (2013.01)

(58) Field of Classification Search
CPC ................................ G06F 3/038; B64D 43/00
See application file for complete search history.

(56) References Cited

U.S. PATENT DOCUMENTS

| | | | |
|---|---|---|---|
| 4,130,884 A | 12/1978 | Hildinger | |
| 6,421,645 B1 | 7/2002 | Beigi et al. | |
| 7,299,187 B2 | 11/2007 | Tahara et al. | |
| 7,458,029 B2 | 11/2008 | Agrawala et al. | |
| 7,620,901 B2 | 11/2009 | Carpenter et al. | |
| 8,347,215 B2 | 1/2013 | Carpenter et al. | |
| 8,515,763 B2 | 8/2013 | Dong et al. | |
| 9,392,326 B2 | 7/2016 | Lee et al. | |
| 9,569,174 B2 | 2/2017 | Rogers et al. | |
| 9,959,861 B2 | 5/2018 | Zhou et al. | |
| 9,965,035 B2 | 5/2018 | Santamaria et al. | |
| 9,983,664 B2 | 5/2018 | Kim et al. | |
| 9,996,231 B2 | 6/2018 | Missig et al. | |
| 10,127,564 B2 | 11/2018 | Heath | |
| 10,191,619 B2 * | 1/2019 | Yoon | G06F 3/0482 |
| 10,445,355 B2 | 10/2019 | Miller et al. | |
| 10,447,744 B2 | 10/2019 | Feldman et al. | |
| 10,558,351 B2 | 2/2020 | Shan | |
| 10,664,122 B2 * | 5/2020 | Choi | G06F 3/0481 |
| 10,991,364 B1 * | 4/2021 | Hoover | G10L 15/30 |
| 11,002,558 B2 * | 5/2021 | Santamaria | G06F 9/451 |
| 11,144,535 B2 | 10/2021 | Gilbertson et al. | |

(Continued)

FOREIGN PATENT DOCUMENTS

| | | |
|---|---|---|
| CN | 104570835 A | 4/2015 |
| CN | 113936650 A | 1/2022 |

(Continued)

*Primary Examiner* — Ariel A Balaoing
(74) *Attorney, Agent, or Firm* — Lorenz & Kopf LLP

(57) ABSTRACT

Methods and systems are provided for resolving a user input. One method involves assigning a first identifier to a first stream of messages from a user input device corresponding to a first user input with respect to an application, and while a user interaction state associated with the first stream of messages is active, assigning a second identifier to a second stream of messages from the user input device, and in response to detecting the second identifier corresponds to the first identifier, deactivating the first stream of messages associated with the first stream of messages, wherein deactivating the first stream of messages results in the application responding to the second stream of messages corresponding to the second user input.

20 Claims, 5 Drawing Sheets

(56) References Cited

U.S. PATENT DOCUMENTS

| | | | |
|---|---|---|---|
| 11,221,729 B1* | 1/2022 | Bauchot | G06F 3/04812 |
| 11,467,711 B2 | 10/2022 | Ma et al. | |
| 11,714,539 B1* | 8/2023 | Boswell | G06F 3/0487 |
| | | | 715/856 |
| 2002/0036660 A1* | 3/2002 | Adan | G06F 3/03543 |
| | | | 715/802 |
| 2003/0066016 A1 | 4/2003 | Wehage | |
| 2005/0180327 A1 | 8/2005 | Banerjee et al. | |
| 2006/0168531 A1* | 7/2006 | Sato | G06F 3/038 |
| | | | 715/764 |
| 2006/0212291 A1 | 9/2006 | Matsuo | |
| 2007/0052725 A1 | 3/2007 | Ostojic et al. | |
| 2007/0153806 A1 | 7/2007 | Celinski et al. | |
| 2007/0288129 A1 | 12/2007 | Komer et al. | |
| 2010/0180210 A1* | 7/2010 | Toyama | G06F 3/038 |
| | | | 715/750 |
| 2010/0293501 A1 | 11/2010 | Russ et al. | |
| 2012/0110403 A1 | 5/2012 | Chen et al. | |
| 2013/0104065 A1* | 4/2013 | Stecher | G06F 3/04842 |
| | | | 715/767 |
| 2013/0162519 A1 | 6/2013 | Ameling et al. | |
| 2014/0019873 A1* | 1/2014 | Gupta | G06F 9/451 |
| | | | 715/744 |
| 2016/0321841 A1 | 11/2016 | Christen et al. | |
| 2020/0233501 A1 | 7/2020 | Jacobs | |
| 2020/0249811 A1 | 8/2020 | Lemay et al. | |
| 2021/0342785 A1 | 11/2021 | Mann et al. | |
| 2022/0100463 A1 | 3/2022 | Crouch et al. | |

FOREIGN PATENT DOCUMENTS

| | | |
|---|---|---|
| CN | 111338555 B | 3/2022 |
| EP | 1487171 A1 | 12/2004 |
| EP | 3593235 A1 | 1/2020 |
| EP | 3998527 A2 | 5/2022 |
| JP | 2013239137 A | 11/2013 |
| JP | 7051756 B2 | 4/2022 |
| WO | 2019063496 A1 | 4/2019 |
| WO | 2021184375 A1 | 9/2021 |
| WO | 2022005819 A1 | 1/2022 |
| WO | 2022143198 A1 | 7/2022 |

* cited by examiner

CURSOR MANAGEMENT METHODS AND SYSTEMS FOR RECOVERY FROM INCOMPLETE INTERACTIONS

TECHNICAL FIELD

The subject matter described herein relates generally to electronic displays, and more particularly, embodiments of the subject matter relate to cursor management for aircraft systems and related cockpit touchscreen displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. In some instances, a cockpit display may have a limited viewable area for a user to review the displayed information and make selections. This can be an issue due to the amount of information and selectable elements that may be displayed. For example, when displayed elements overlap or are otherwise positioned in close proximity, in order to select a desired element, a pilot may have to pan or otherwise navigate within the display to center or focus the displayed area on the desired element or area for selection, and then zoom in or otherwise change the range or scale of the displayed area to achieve sufficient spatial differentiation among elements to enable selection of the desired element.

Electronic displays onboard vehicles are often small and compact due to limited available space and other constraints on locations where displays can be located. As a result, manipulating onboard electronic displays, such as a touchscreen display in an aircraft cockpit, in order to arrive at a desired selection can be time consuming, inefficient, and error prone, particularly when multiple different graphical user interface (GUI) displays or windows associated with different software applications or services are concurrently depicted. Moreover, modern aircraft often include one or more touchscreens placed between the pilot and co-pilot to function as a shared interface capable of receiving input from both the pilot and co-pilot concurrently. Accordingly, it is desirable to improve the ease of interaction with GUI displays to support concurrent inputs from different users while maintaining coherent and intuitive responses to the respective inputs. Furthermore, other desirable features and characteristics will become apparent from the subsequent detailed description and the appended claims, taken in conjunction with the accompanying drawings and this background.

BRIEF SUMMARY

Methods and systems are provided for resolving user input and recovering from incomplete user interactions. One method involves assigning a first identifier to a first stream of messages from a user input device corresponding to a first user input with respect to an application, and while a user interaction state associated with the first stream of messages is active, assigning a second identifier to a second stream of messages from the user input device and deactivating the first stream of messages associated with the first stream of messages in response to detecting the second identifier corresponds to the first identifier, where deactivating the first stream of messages results in the application responding to the second stream of messages corresponding to the second user input. The first identifier is associated with a first source of the first user input associated with the first stream of messages and the second identifier is associated with a second source of a second user input associated with the second stream of messages.

In another embodiment, a non-transitory computer-readable medium is provided having computer-executable instructions stored thereon that, when executed by a processing system, cause the processing system to assign a first identifier to a first stream of messages from a user input device corresponding to a first user input with respect to an application, wherein the first identifier is associated with a first source of the first user input associated with the first stream of messages, and while a user interaction state associated with the first stream of messages is active, assign a second identifier to a second stream of messages from the user input device, wherein the second identifier is associated with a second source of a second user input associated with the second stream of messages, and in response to detecting the second identifier corresponds to the first identifier, deactivate the first stream of messages associated with the first stream of messages, wherein deactivating the first stream of messages results in the application responding to the second stream of messages corresponding to the second user input.

In another embodiment, a system is provided that includes a user input device to provide a message stream associated with a user input, one or more display devices, and a processing system coupled to the user input device and the one or more display devices. The processing system is configurable to implement a user input management service to assign a first identifier to a first stream of messages from the user input device corresponding to a first user input with respect to an application, wherein the first identifier is associated with a first source of the first user input associated with the first stream of messages, and while a user interaction state associated with the first stream of messages is active, assign a second identifier to a second stream of messages from the user input device, wherein the second identifier is associated with a second source of a second user input associated with the second stream of messages, and in response to detecting the second identifier corresponds to the first identifier, deactivate the first stream of messages associated with the first stream of messages. Deactivating the first stream of messages results in the application responding to the second stream of messages corresponding to the second user input.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
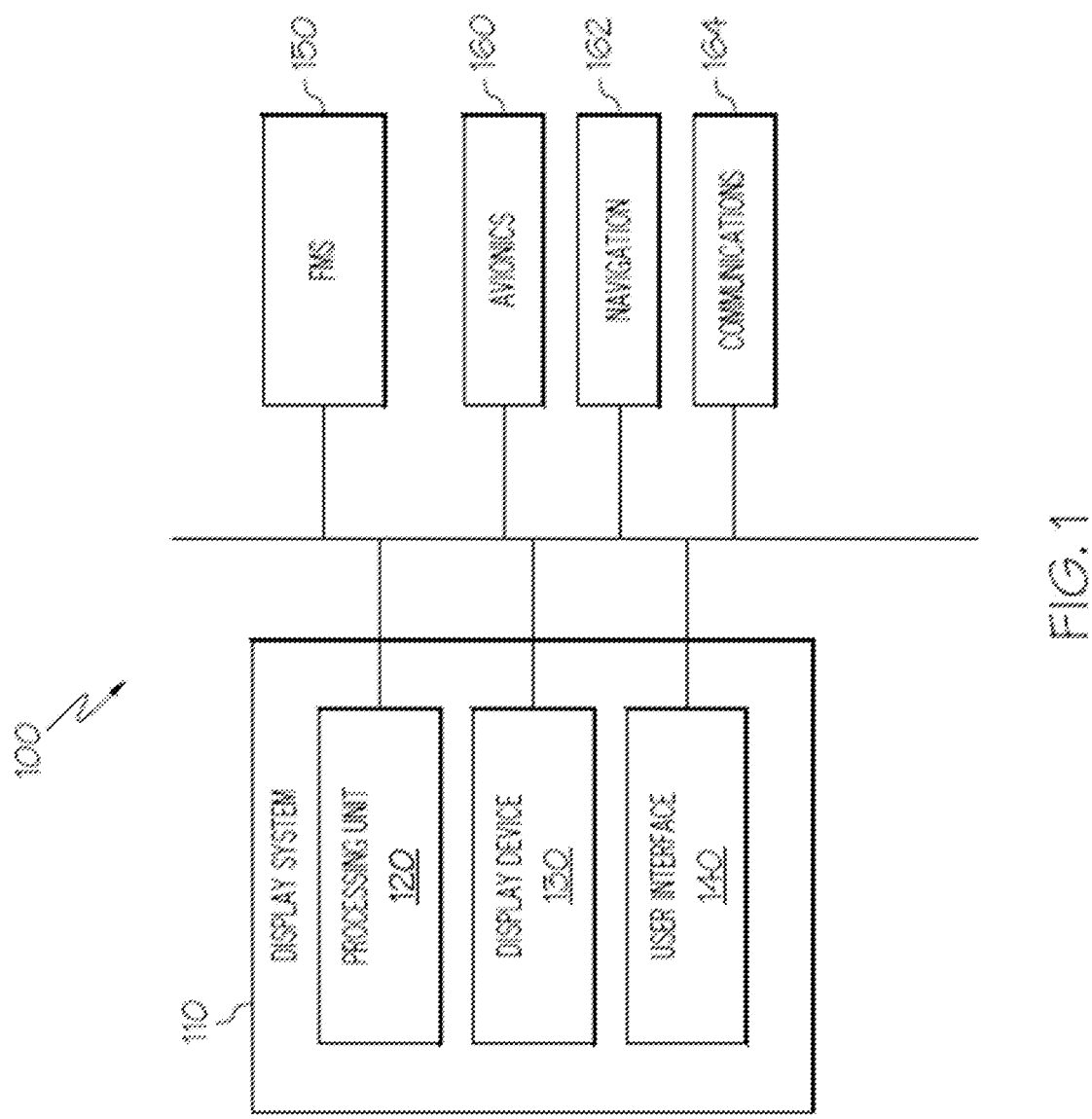
FIG. 1 is a block diagram of a system for an aircraft in an exemplary embodiment.

Embodiments of the subject matter described herein generally relate to systems and methods for resolving a user input provided with respect to a graphical user interface (GUI). For purposes of explanation, the subject matter may be described herein primarily in the context of a tactile user input on a touchscreen, touch-panel, or other tactile input device; however, it should be appreciated that the subject matter described herein is not limited to tactile user inputs or tactile input devices and may be implemented in an equivalent manner in the context of any type of user input using any type of user input device. Furthermore, although the subject matter is described herein primarily in the context of a flight deck display, an electronic flight bag (EFB) or other cockpit display onboard an aircraft an aviation context, it should be understood that the subject matter described herein is not limited to vehicle systems or applications and may be similarly utilized in other application, systems or environments, including, but not limited to use with other types of vehicles (e.g., automobiles, marine vessels, trains, etc.).

Exemplary embodiments described herein include a user input management service that receives message streams corresponding to user inputs from one or more user input devices and associates a respective message stream with a respective application based on the location of the respective user input. In this manner, user inputs at different locations may be associated with different applications, thereby allowing different users to concurrently interact with different GUI elements or displays depicted on a common display device. Additionally, the user input management service maintains an association between a message stream associated with a user input and the application associated with the GUI display or GUI element where the respective user input was initiated, thereby allowing the application (or the corresponding GUI display or GUI element) to respond to the user input as the location of the user input changes while the state of the user input is maintained. Thus, as a user input is dragged, panned or otherwise moved from its initial location, the originating application continues to respond coherently and intuitively to the user input while the user input is maintained, even if the user input moves from the GUI display or GUI element associated with the originating application, rather than disrupting or prematurely terminating the user input (e.g., when the location of the user input is moved away from the initial GUI display or GUI element).

As described in greater detail below, in response to identifying an updated location associated with a message of the message stream that corresponds to a GUI display associated with a different application, the user input management service may instruct or otherwise notify that other application of the updated location of the user input to cause that application to generate or otherwise provide a graphical representation of a cursor associated with the user input at the updated location within the GUI display associated with that application, while concurrently providing the updated location of the user input to the initial application. As a result, the initial application (or the GUI display or GUI element associated therewith) where the user input initiated or began can intuitively respond to the user input in accordance with the updated location, while the other application renders or otherwise generates a cursor that moves intuitively across the different GUI displays associated with the different applications to concurrently provide cognitive visual feedback of the current location of the user input substantially in real-time while the user input is maintained.

FIG. 1 is a schematic representation of an aircraft system 100 with a visual display system 110 coupled to a flight management system (FMS) 150 and one or more data sources 160, 162, 164. The components and subcomponents of system 100 may be coupled together in any suitable manner, such as with a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft.

The visual display system 110 includes a processing unit 120, a display device 130, and a user interface 140. Generally, the visual display system 110 displays information from the FMS 150 via the display device 130 and enables interaction between a user (e.g., a pilot or other type of operator) and the FMS 150, as described in greater detail below. Additional information about the operation will be provided below after a brief introduction of each component.

In one or more embodiments, the processing unit 120 is a computer processor associated with flight planning and management functions, particularly the display and navigation of a list of waypoints, such as in a flight plan. In one exemplary embodiment, the processing unit 120 functions to at least receive and/or retrieve aircraft flight management information (e.g., from the FMS 150 and data sources 160, 162, 164). The processing unit 120 may also generate display commands for displaying the flight management information. In this regard, the processing unit 120 may function as a graphics display generator to generate display commands based on algorithms or other machine instructions stored in the processing unit 120 or in separate memory components. The processing unit 120 may then send the generated display commands to display device 130 for presentation to the user. The processing unit 120 may additionally receive and generate display commands based on inputs via the user interface 140.

Depending on the embodiment, the processing unit 120 may be implemented or realized with a general-purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100. The processing unit 120 may further include any suitable type of memory or data storage, such as for example, RAM, ROM, EEPROM, flash memory, optical or magnetic storage devices, or any other medium that can be used to store and access desired information.

The display device 130 is coupled to the processing unit 120 for rendering information to the user based on display commands. In one exemplary embodiment, the display device 130 may be a multifunction monitor, unit, or any display suitable for displaying various symbols and information, such as a multifunction control display unit (MCDU), cockpit display device (CDU), primary flight display (PFD), and/or navigation display. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

In exemplary embodiments, the user interface 140 is coupled to the processing unit 120 to allow a user to interact with the display device 130 and/or other elements of the system 100. The user interface may be realized as a keypad, touchpad, keyboard, mouse, touch panel, joystick, knob, line select key or another suitable device adapted to receive input from a user. In further embodiments, the user interface 140 is realized as audio input and output devices, such as a speaker, microphone, audio transducer, audio sensor, or the like. In some embodiments, the user interface may be incorporated into the display device 130. For example, in one or more embodiments, the display device 130 and user interface 140 are integrated as an interactive MCDU with a display screen and a keyboard, touchscreen and/or other mechanisms for function, display, and/or cursor control.

The FMS 150 is coupled to the display system 110 and one or more data sources 160, 162, 164 and generally functions to support navigation, flight planning, and other aircraft control functions, as well as provides real-time data and/or information regarding the operational status of the aircraft. The FMS 150 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. In particular, the FMS 150 may store and/or generate a flight plan for traveling between a current or initial destination and a final destination.

The data sources 160, 162, 164 can include any suitable type of data source that may be used to construct or modify the flight plan, such as an avionics database 160, a navigation system 162, and a communications system 164, as examples. The avionics database 160 may store aeronautical information data, including, for example, flight plan data, data related to airways, navigational aids, navigational data, obstructions, taxi registration, Special Use Airspace, political boundaries, COM frequencies, approach information, geographical information and the like. The navigation system 162 is configured to provide real-time navigational data and/or information regarding operation of the aircraft. The communications system 164 is suitably configured to support communications between the aircraft and another aircraft or ground location (e.g., air traffic control) via a radio system or another suitable data link system.

In one or more exemplary implementations, the display system 110 particularly functions to display a flight plan, including as examples, a selected or otherwise designated flight plan for subsequent execution, a flight plan selected for review, and/or a flight plan currently being executed by the aircraft. In some embodiments, the FMS 150 may store predefined flight plans, while in further embodiments, the flight plan may be uplinked via the communications system 164 and/or manually entered or created by the user via the user interface 140. In one or more exemplary embodiments, the display system 110 renders or otherwise provides a lateral map or other navigational map that includes a graphical representation of at least a portion of the route defined by the flight plan. In addition to the displayed flight plan flight path, the lateral map may also include graphical representations of terrain, meteorological conditions, navigational reference points (e.g., waypoints, navigational aids, distance measuring equipment (DMEs), very high frequency omni-directional radio ranges (VORs), and the like), designated special use airspaces or airspace restrictions, air traffic, obstacles, and/or the like. In this regard, the lateral map may include different layers of graphical elements that are based on or otherwise derived from different data sources, which, in some embodiment, may be selectively added or removed from the display. Additionally, graphical elements in different data layers may be collocated or otherwise correspond to overlapping geographic locations or regions, such that different types of graphical elements may overlie one another on the display.

In exemplary embodiments, the flight plan includes a sequence of navigational reference points or waypoints that define a flight path or route to be flown by the aircraft. In practice, waypoints may have various types of characteristics, attributes, or properties associated therewith. These characteristics may be a function of the waypoint itself or a function of the placement of the waypoint within the flight plan. For example, a waypoint may be associated with a particular type of aircraft procedure (e.g., a turn or holding procedure) or be associated with a designated constraint, such as noise, altitude, and/or speed constraints. As further examples, a waypoint may be associated with a specific segment of the flight plan (e.g., departure, en route, approach, missed approach, and/or alternate flight plan). One or more of the characteristics, attributes and/or properties associated with a given waypoint may be presented in association with that waypoint when that waypoint is currently selected.

Generally, the FMS 150 may associate different characteristics to waypoints of a flight plan based on various factors. For example, the FMS 150 may determine some waypoint characteristics based on information from the navigation system 162 and/or avionics database 160 (e.g., identifying a waypoint as a runway or compulsory reporting point; identifying stored defined patterns associated with the waypoint, such as procedure turns, published holding patterns, etc.) or based on flight plan modifications (e.g., the crew and/or operator may insert a holding pattern at a specific waypoint as instructed by ground station). In practice, the FMS 150 may evaluate and divide the entire flight plan to map the waypoints to specific flight phases (or segments), e.g., departure, en-route, arrival procedures, etc. For example, the FMS 150 can assign waypoints from origin to top of climb as departure waypoints; from top of climb to top of descent including any step climbs as en-route waypoints; and from top of descent to destination as arrival waypoints. In this manner, the FMS 150 may identify different logical groupings of waypoints according to logically distinct operational segments of the flight plan.

In one or more implementations, the display system 110 and/or processing unit 120 displays, renders or otherwise presents a navigational map graphical user interface (GUI) display on a display device 130 onboard an aircraft. A navigational map generally includes a graphical representation of a portion of route defined by a flight plan for the aircraft and a graphical representation of the aircraft overlaid or rendered on top of a background. Depending on the implementation, the background may include graphical representations of the terrain, topology, navigational reference points, airspace designations and/or restrictions, or other suitable items or points of interest corresponding to the currently displayed area of the navigational map, based upon corresponding data which may be maintained in a terrain database, a navigational database, a geopolitical database, or another suitable database. For example, the display system 110 and/or processing unit 120 may render a graphical representation of navigational aids (e.g., VORs, VORTACs, DMEs, and the like) and airports within the currently displayed geographic area of the navigational map overlying the background. Some embodiments of the navigational map may also include graphical representations of airspace designations and/or airspace restrictions, cities, towns, roads, railroads, and other geo-political information. Depending on the implementation, the navigational map may depict a top view (e.g., from above the aircraft), alternatively referred to as a lateral map or lateral view, or various perspective views, such as side views, three-dimensional views (e.g., a three-dimensional synthetic vision display), angular or skewed views, and the like. The displayed area of the navigational map generally corresponds to the geographic area that is currently displayed in the navigational map, that is, the field of view about the center location of the navigational map. In this regard, the center location of the navigational map may correspond to a reference geographic location for the middle or geometric center of the navigational map.

In one or more exemplary embodiments, the navigational map is associated with the movement of the aircraft, and the aircraft symbology and/or background refreshes or otherwise updates as the aircraft travels, such that the graphical representation of the aircraft is positioned over the terrain background in a manner that accurately reflects the current (e.g., instantaneous or substantially real-time) real-world positioning of the aircraft relative to the earth. In some embodiments, the aircraft symbology is shown as traveling across the navigational map (e.g., by updating the location of the aircraft symbology with respect to the background), while in other embodiments, the aircraft symbology may be located at a fixed position on the navigational map (e.g., by updating the background with respect to the aircraft symbology such that the map is maintained centered on and/or aligned with the aircraft symbology). Additionally, depending on the embodiment, the navigational map may be oriented in a cardinal direction (e.g., oriented north-up so that moving upward on the map corresponds to traveling northward), or alternatively, the orientation of the navigational map may be track-up or heading-up (i.e., aligned such that the aircraft symbology is always traveling in an upward direction and the background adjusted accordingly).

Figure 2:
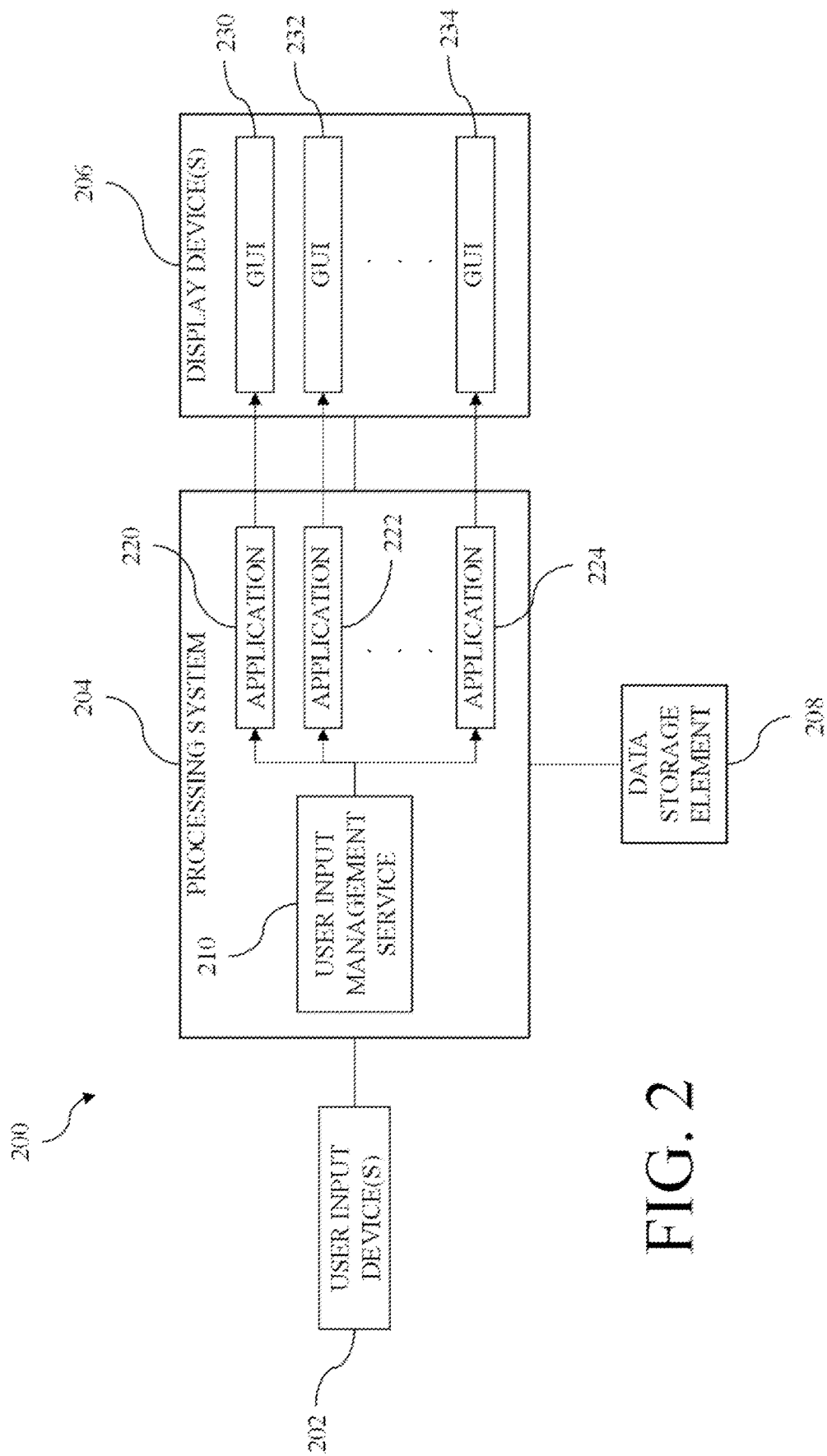
FIG. 2 depicts an exemplary display system suitable for use with the aircraft system of FIG. 1 in one or more exemplary embodiments.

FIG. 2 depicts an exemplary embodiment of a display system 200 suitable for use in a vehicle system, such as the aircraft system 100 of FIG. 1. The display system 200 includes, without limitation, one or more user input devices 202 (e.g., user interface 140) that are coupled to a processing system 204 (e.g., processing unit 120) that supports user interaction with one or more GUI displays 230, 232, 234 that are displayed, rendered or otherwise provided on one or more display devices 206 (e.g., display device 130) that are coupled to the processing system 204. It should be appreciated that FIG. 2 is a simplified representation of the display system 200 for purposes of explanation and is not intended to be limiting.

The user input device(s) 202 generally represent the human-machine interface hardware components that allow a user (e.g., a pilot, co-pilot, or crew member) to interact with the GUI displays 230, 232, 234 provided on the display device(s) 206 and/or other elements coupled to the display system 200 (e.g., the FMS 150 or other onboard avionics systems 160, 162, 164). Depending on the embodiment, the user input device(s) 202 may include or otherwise be realized as a cursor control device (CCD), keypad, touchpad, keyboard, mouse, touch panel (or touchscreen), joystick, knob, line select key or another suitable device adapted to receive input from a user. The display device(s) 206 generally represent the electronic display hardware capable of graphically displaying information (e.g., flight information or other data associated with operation of the aircraft) under control of the processing system 204.

The processing system 204 generally represents the hardware, software, and/or firmware components configured to facilitate communications and/or interaction between the user input device(s) 202, the display device(s) 206 and potentially other elements coupled to the display system 200 (e.g., the FMS 150 or other onboard avionics systems 160, 162, 164) and perform additional tasks and/or functions to support operation of the display system 200, as described in greater detail below. Depending on the embodiment, the processing system 204 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 204 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 204 includes processing logic that may be configured to carry out the functions, techniques, and processing tasks associated with the operation of the display system 200, as described in greater detail below. Furthermore, the steps of a method or algorithm described in connection with the embodiments disclosed herein may be embodied directly in hardware, in firmware, in a software module executed by the processing system 204, or in any practical combination thereof. For example, in one or more embodiments, the processing system 204 includes or otherwise accesses a data storage element 208 (or memory), which may be realized as any sort of non-transitory short or long term storage media capable of storing computer-readable (or machine-readable) programming instructions for execution by the processing system 204. The code or other executable programming instructions, when read and executed by the processing system 204, cause the processing system 204 to support or otherwise perform certain tasks, operations, functions, and/or processes described herein.

In exemplary embodiments described herein, the code or other executable programming instructions maintained at the data storage element 208 are configurable to cause the processing system 204 to execute, generate or otherwise support a user input management service 210 that functions as an intermediary between the user input device(s) 202 and any number of different display software applications 220, 222, 224 that are configurable to render, display, generate or otherwise provide one or more corresponding GUI elements or displays 230, 232, 234 on the display device(s) 206. In this regard, it should be noted that although FIG. 2 depicts the different display software applications 220, 222, 224 being executed, generated or otherwise supported by the processing system 204 (e.g., based on respective code or executable programming instructions maintained in memory 208), in practice, one or more of the display software applications 220, 222, 224 may be implemented by or at another component, which may be external to the display system 200 (e.g., the FMS 150 or other onboard avionics systems 160, 162, 164 coupled to the display system 110). Moreover, although FIG. 2 depicts a one to one relationship between the different display software applications 220, 222, 224 and the GUI displays 230, 232, 234, in practice, an individual display software application 220, 222, 224 may control, render or otherwise provide any number of different GUI elements or displays on the display device(s) 206. In this regard, the implementation details of the different display software applications 220, 222, 224 is not germane to the subject matter described herein.

In exemplary implementations, the user input management service 210 supports multiple concurrent user inputs, which could be received from any number of different users via any number of different user input devices 202, by establishing and maintaining associations between a respective user input and a respective one of the applications 220, 222, 224 responsible for responding to that respective user input based on a relationship between the initial location of the respective user input corresponding to a location of an interactive or selectable layer of a GUI display 230, 232, 234 associated with the respective application 220, 222, 224. In this regard, the applications 220, 222, 224 notify or otherwise register the particular regions (or ranges of locations) where a GUI display 230, 232, 234 associated with that respective application 220, 222, 224 is depicted (e.g., by providing a range of pixel coordinate locations encompassed by a layer of the GUI display 230, 232, 234). The user input management service 210 effectively creates and maintains a hierarchical arrangement of different GUI layers associated with the different applications 220, 222, 224 for the different locations or regions of the display device(s) 206 where GUI displays 230, 232, 234 are presented.

When a user input is initiated, the user input management service 210 utilizes the initial location information contained in the initial message(s) of the user input message stream received from the respective user input device 202 to identify which application 220, 222, 224 is associated with the top or uppermost layer in the hierarchical arrangement at that location on a display device 206. The user input management service 210 provides indicia of the user input at the initial user input location to the respective application(s) 220, 222, 224 registered at that location, where the respective gesture recognizer associated with the respective application(s) 220, 222, 224 identifies or otherwise determines whether to respond to the user input. In this regard, a gesture recognizer is a software component associated with or assigned to a particular region of a display that includes, encompasses or otherwise corresponds to an interactive feature, element or functionality of the respective software application 220, 222, 224.

When the gesture recognizer associated with the respective application(s) 220, 222, 224 determines the user input should be responded to (e.g., by virtue of the user input corresponding to selection of a GUI element or other interactive feature of the respective GUI display 230, 232, 234), the respective application 220, 222, 224 notifies the user input management service 210, which, in turn, maintains an association between the message stream for that user input and the respective application 220, 222, 224 having the highest position in the hierarchical arrangement (e.g., the application 220, 222, 224 associated with the GUI display 230, 232, 234 that overlies or is in front of other GUI displays 230, 232, 234 at that location) as being the originating application with respect to which the user input originated, such that the user input does not fall through to a lower layer on the display device 206. In other words, by virtue of the association, the associated application 220, 222, 224 is effectively subscribed to the message stream and the user input management service 210 routes messages associated with a particular message stream to its assigned application 220, 222, 224 subscribed to that message stream, so that any user input or other cursor interaction starting within the boundaries of a region associated with a particular gesture recognizer of the assigned application 220, 222, 224 is captured and subsequently interpreted solely by that gesture recognizer, even though the user input may move outside the boundary of the GUI display 230, 232, 234 associated with the assigned application 220, 222, 224. On the other hand, when the gesture recognizer determines the user input should not be responded to, the user input management service 210 maintains an association between the message stream for that user input and the respective application 220, 222, 224 but designates the user input message stream as non-interactive such that the assigned application 220, 222, 224 does not respond to the user input message stream within its extent beyond drawing a graphical representation of a cursor associated with the user input. For purposes of explanation, the respective application 220, 222, 224 associated with or otherwise assigned with responding to a particular message stream may alternatively be referred to herein as the subscribed application.

Using identifying information associated with the message stream and the messages contained therein, the user input management service 210 maintains an association between the user input and the respective subscribed application 220, 222, 224 for the user input to enable the subscribed application 220, 222, 224 to respond to changes in the location of the user input, even if the user input is dragged, panned or otherwise relocated to an updated location that is outside the confines of the regions or locations where a GUI display 230, 232, 234 associated with that respective application 220, 222, 224 is depicted. For example, while the user input is maintained in the current activated or selected state providing a continuous stream of messages containing real-time location information for the user input, based on the association between the message stream and the subscribed application 220, 222, 224, the user input management service 210 continues providing indicia of the updated location of the user input to the subscribed application 220, 222, 224 so that the subscribed application 220, 222, 224 can continue to respond to the user input in accordance with the updated location. At the same time, the user input management service 210 continues providing indicia of the updated location of the user input to another application 220, 222, 224 that is registered or otherwise associated with a region encompassing the updated location of the user input and assigned to the highest level in the hierarchical arrangement of GUI display layers at that updated location. This, in turn, allows for the other application 220, 222, 224 to concurrently render, display or otherwise generate a graphical representation of a cursor associated with the user input at the updated location within its own associated GUI display 230, 232, 234 without responding to the user input, while the subscribed application 220, 222, 224 concurrently responds to the updated location of the user input.

In this manner, a user input that starts in one GUI display 230, 232, 234 with respect to one application 220, 222, 224 is persisted or maintained while the user input is maintained in the activated or selected state to provide an intuitive response to changes to the location of the user input, rather than interrupting or terminating the response to the user input when the location of the user input no longer resides within the confines of the subscribed application 220, 222, 224, while still providing cognitive visual feedback of the location of the user input within a GUI display 230, 232, 234 of another application 220, 222, 224. Additionally, by maintaining the association between message streams and applications 220, 222, 224, a continuous or persistent user input associated with one application 220, 222, 224 is not interrupted or terminated when another user input is received with respect to the same or different application 220, 222, 224 by virtue of the subsequent user input having different identifying information (e.g., a different message stream identifier) and being separately and independently associated with an application 220, 222, 224, thereby allowing multiple different user inputs to concurrently with respect to the same or different GUI displays 230, 232, 234 on the same display device 206.

Figure 3:
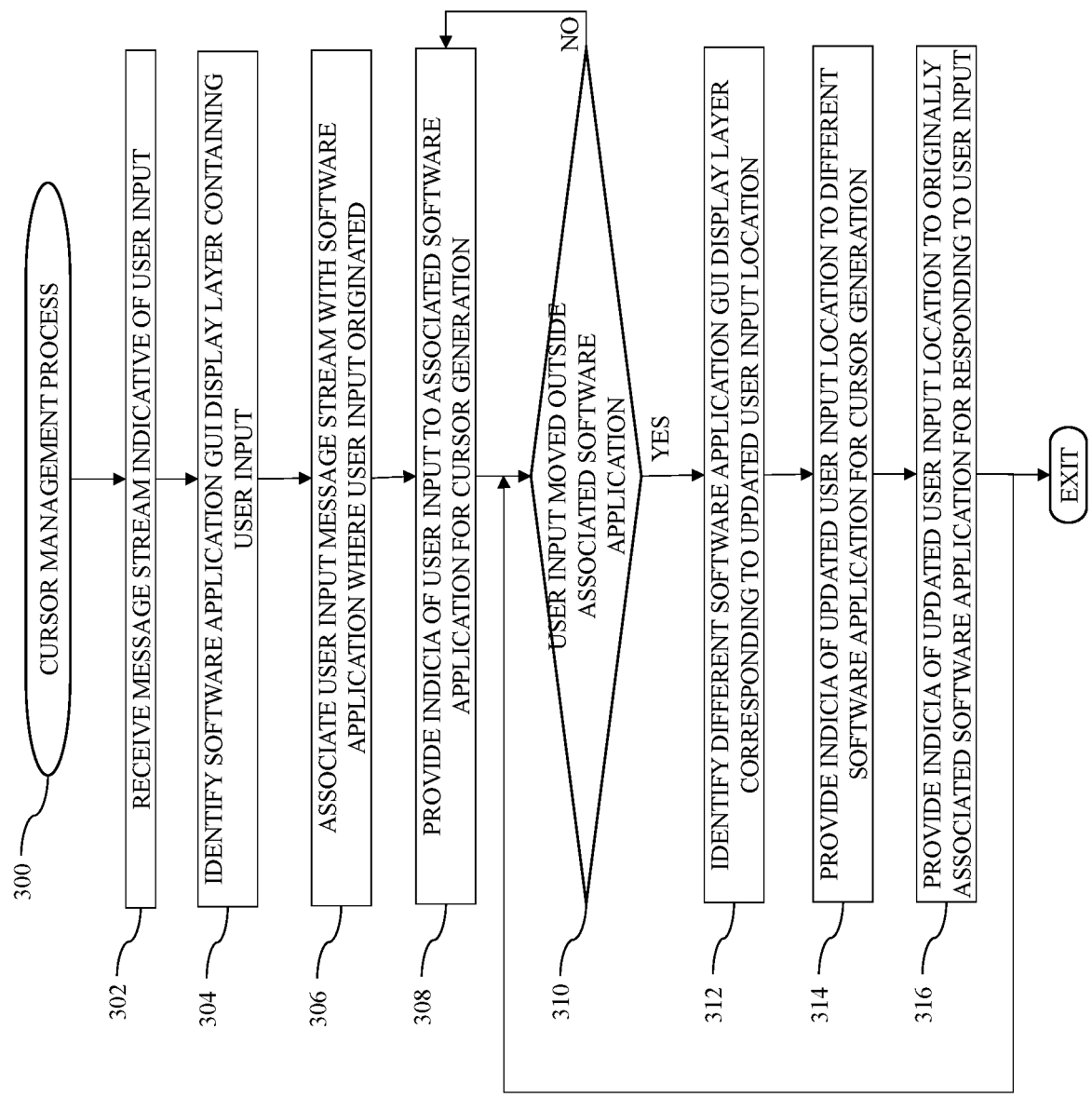
FIG. 3 depicts an exemplary cursor management process suitable for implementation by the display system of FIG. 2 in one or more exemplary embodiments.

FIG. 3 depicts an exemplary embodiment of a cursor management process 300 suitable for implementation by the user input management service 210 in the display system 200 of FIG. 2. The various tasks performed in connection with the illustrated process may be implemented using hardware, firmware, software executed by processing circuitry, or any combination thereof. In practice, portions of the cursor management process 300 may be performed by different elements of the aircraft system 100 and/or the display system 110, 200. That said, for purposes of explanation, the cursor management process 300 may be described herein primarily in the context of an implementation by or at the user input management service 210 associated with the display system 110, 200. It should be appreciated that the cursor management process 300 may include any number of additional or alternative tasks, the tasks need not be performed in the illustrated order and/or the tasks may be performed concurrently, and/or the cursor management process 300 may be incorporated into a more comprehensive procedure or process having additional functionality not described in detail herein. Moreover, one or more of the tasks shown and described in the context of FIG. 3 could be omitted from a practical embodiment of the cursor management process 300 as long as the intended overall functionality remains intact.

Referring to FIG. 3, with continued reference to FIGS. 1-2, in the illustrated embodiment, the cursor management process 300 initializes or otherwise begins in response to receiving a message stream from a user input device indicative of a user input with respect to content displayed on a display device (task 302). For example, when a user manipulates or otherwise interacts with a user input device 202, the user input device 202 may automatically transmit or otherwise provide a stream of one or more messages to the user input management service 210 at the processing system 204 that include indicia of the characteristics of the user input (e.g., the location of the user input, the duration of the user input, the type or nature of the user input, etc.). In one or more embodiments, individual messages of the message stream provided by a user input device 202 includes an identifier or other indication of the user input device 202 that is the source of the user input, an indication of the location or other physical characteristics of the user input corresponding to the location on the display device(s) 206 where the user input is directed, and an indication of a state of the user input. For example, when the user input device 202 is realized as a mouse, a message may include indication of the mouse as the source of the user input, location information identifying where the mouse is positioned or oriented relative to an initial reference position of the mouse, and state information indicating whether or not any buttons on the mouse are depressed or actuated, and if so, indication of the actuated buttons. In one or more implementations, a user input device 202 that includes buttons or other actuatable element that support multiple inputs may also provide indication of whether or not a respective user input corresponds to the first button to be pressed (e.g., when the number of buttons pressed transitions from zero to a nonzero number) and/or the last button to be released (e.g., when the number of buttons pressed transitions from a nonzero number to zero), along with other cursor-related information (e.g., cursor visible, cursor valid, cursor scroll and/or the like) depending on the particular type of user input device 202. As another example, when the user input device 202 is realized as a touchscreen or touch panel, a message may include indication of the touchscreen or touch panel as the source of the user input, location information identifying where the tactile user input is provided or oriented with respect to the touchscreen or touch panel, and state information indicating whether or not the tactile user input corresponds to selection or actuation. In some implementations, the user input device 202 may provide separate or distinct message streams for different types of recognized gestures (e.g., pan, zoom, rotate, etc.) that can be associated with an ephemeral gesture cursor.

In response to receiving a message stream indicative of user input, the cursor management process 300 identifies or otherwise determines which software application is associated with the GUI display layer that contains, encompasses or is otherwise collocated with the location of the user input and is responsible for responding to the user input (task 304). For example, as described above in the context of FIG. 2, in exemplary implementations, different software applications 220, 222, 224 (or alternatively, the windowing system associated with the underlying operating system) register with the user input management service 210 to notify the user input management service 210 of the regions or ranges of locations that define the area(s) on the display device(s) 206 where GUI display layers associated with the respective software application 220, 222, 224 exist. The user input management service 210 implements a hierarchy to manage the ordering of the layers of the different GUI displays 230, 232, 234 associated with the different software applications 220, 222, 224, for example, in a direction orthogonal to the reference plane of the display device(s) 206 (e.g., the z-reference axis direction for a two-dimensional display oriented to provide an xy reference plane for a Cartesian coordinate system). The user input management service 210 utilizes the location information associated with the received user input (e.g., pixel coordinate locations in an xy reference frame) to identify the potential software application(s) 220, 222, 224 having corresponding GUI displays 230, 232, 234 collocated with the received user input, and then utilizes the hierarchical arrangement of the GUI display layers to identify the software application 220, 222, 224 associated with the topmost or uppermost GUI display layer at the location of the user input.

In one or more implementations, to identify the software application 220, 222, 224 responsible for responding to the user input, the user input management service 210 incrementally progresses through the currently visible layers of the hierarchical arrangement from top to bottom until a gesture recognizer associated with a respective software application 220, 222, 224 captures or otherwise recognizes the user input as an input gesture to be responded to by the respective layer of the GUI display 230, 232, 234 associated with the respective software application 220, 222, 224. In this regard, in some implementations, the user input management service 210 provides indication of the user input to the highest ranked software application 220, 222, 224 in the hierarchical arrangement to verify or otherwise determine whether the user input corresponds to a feature, element or functionality within one of its GUI display layers that is selectable, actuatable or otherwise interactive. When the highest ranked software application 220, 222, 224 in the hierarchical arrangement does not recognize or capture the user input (e.g., because the location of the user input is not within a visible region associated with the respective application 220, 222, 224), the user input management service 210 provides indication of the user input to the next highest ranked software application 220, 222, 224 and so on until the gesture recognizer of a respective software application 220, 222, 224 captures the user input or reaching the lowest software application 220, 222, 224 that is visible at the location.

After identifying the software application responsible for responding to the user input, the cursor management process 300 establishes an association between the user input message stream and that identified software application where the user input initially originated (task 306). In this regard, the user input management service 210 associates a unique identifier assigned to the message stream with the highest ranked software application 220, 222, 224 collocated with the initial location of the user input having a gesture recognizer that captured or otherwise recognized the user input.

After establishing an association between the user input and particular software application 220, 222, 224 where the user input originated, the cursor management process 300 continually communicates or otherwise provides indicia of the user input to its associated software application to support generation of a corresponding cursor visually indicating the location of the user input until determining the user input has moved outside of the associated software application (tasks 308, 310). In this regard, while the user input is maintained, the user input management service 210 continually receives a corresponding message stream from the user input device 202, which, in turn, is routed to the software application 220, 222, 224 to which that message stream has been assigned or is otherwise associated with. For example, for each message in the received message stream, the user input management service 210 may provide a corresponding instruction to its associated software application 220, 222, 224 that indicates the location of the user input, the state of the user input, that the respective software application 220, 222, 224 should act on or otherwise respond to the user input, and that the respective software application 220, 222, 224 should generate or otherwise provide a cursor or other graphical indication of the user input on a display device 206. Based on the location and/or state of the user input, the respective software application 220, 222, 224 automatically performs one or more actions to respond to the user input based on the particular interactive feature, element or functionality that was selected, activated or otherwise engaged by the user input. Moreover, using the location of the user input, the respective software application 220, 222, 224 may automatically generate or otherwise provide a graphical representation of a cursor or other indicator associated with the location of the user input within the respective GUI display 230, 232, 234 associated with the application 220, 222, 224. While the user input is maintained or otherwise persists, the user input device 202 continually provides messages for the message stream, which, in turn, are utilized by the user input management service 210 to provide corresponding indica of the user input location and state to its associated software application 220, 222, 224 for dynamically updating the location and/or state of the graphical representation of the cursor and responding to the updated location and/or state of the user input.

When the cursor management process 300 detects or otherwise identifies a subsequent message of the user input message stream that indicates an updated location of the user input that is no longer encompassed by or otherwise within a GUI display region associated with its assigned software application, the cursor management process 300 identifies or otherwise determines a different software application that should be responsible for generating the visual representation of the cursor based on the updated location of the user input (task 312). In a similar manner as described above, the user input management service 210 utilizes the hierarchical arrangement of GUI display layers to identify which other software application 220, 222, 224 is the uppermost or highest ranked software application 220, 222, 224 at the updated location of the user input that should assume responsibility for generating a cursor corresponding to the user input.

After identifying the different software application responsible for drawing the cursor using the hierarchical arrangement, the cursor management process 300 communicates or otherwise provides indicia of the updated user input location to that different software application for cursor generation while concurrently providing indicia of the updated user input location to the software application originally associated with the user input message stream for responding to the user input (tasks 314, 316). For example, the user input management service 210 may provide an instruction to the other software application 220, 222, 224 where the user input has been moved to that indicates the updated location of the user input, the current state of the user input, and that the respective software application 220, 222, 224 should generate or otherwise provide a cursor or other graphical indication of the user input on a display device 206 (e.g., by setting a cursor visible flag of the instruction to visible, true or some other binary value that conveys the cursor should be drawn), while also indicating that the respective software application 220, 222, 224 should not act on or otherwise respond to the user input (e.g., by setting a user input flag of the instruction to disabled, deactivated or some other binary value that prevents a response). As a result, the other software application 220, 222, 224 may generate, render or otherwise provide a graphical representation of the cursor within its respective GUI display 230, 232, 234 at a location on the display device 206 that reflects the current state of the user input at the updated location of the user input while otherwise ignoring the user input and inhibiting any response to the user input by the interactive features, elements or functionality associated with its respective GUI display 230, 232, 234. Concurrently, the user input management service 210 may provide an instruction to the originally associated software application 220, 222, 224 that indicates the updated location of the user input, the current state of the user input, and that the associated software application 220, 222, 224 should continue to act on or otherwise respond to the user input (e.g., by setting a user input flag of the instruction to enabled, activated or some other binary value that triggers a response), while also indicating that the originally associated software application 220, 222, 224 should not attempt to generate or otherwise provide a cursor or other graphical indication of the user input (e.g., by setting a cursor visible flag of the instruction to invisible, false or some other binary value that conveys the cursor should not be drawn).

As a result of the cursor management process 300, the originally associated software application 220, 222, 224 may continue responding to a persistent user input even as the user input is moved outside the boundaries or confines of a GUI display 230, 232, 234 associated with that application 220, 222, 224, while another application 220, 222, 224 assumes responsibility for drawing or generating a cursor corresponding to that persistent user input within its respective GUI display 230, 232, 234, thereby allowing the cursor to intuitively move across different GUI displays 230, 232, 234 belonging to different applications 220, 222, 224. At the same time, the cursor management process 300 maintains the original correspondence between the persistent user input and the respective application 220, 222, 224 (and interactive feature, element or functionality associated therewith) that is responding to the user input, thereby providing a coherent and intuitive response to the user input by the respective application 220, 222, 224 where the user input originated. In exemplary embodiments, the loop defined by tasks 308, 310, 312, 314 and 316 of the cursor management process 300 may repeat while the same user input is maintained or otherwise persists to allow the visual representation of the cursor corresponding to the user input to effectively move across different applications, GUI displays and/or display devices while maintaining the original correspondence between the user input and the particular feature, element or functionality that the user input is intended to interact with.

Figure 5:
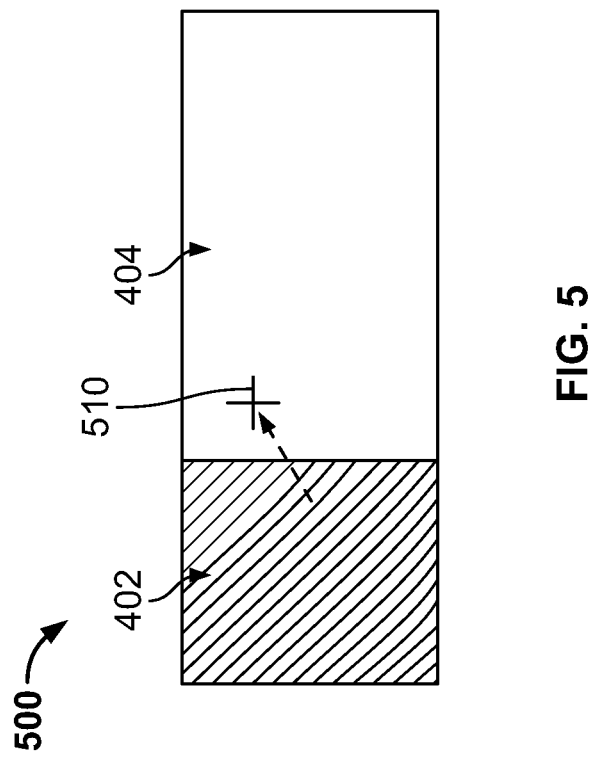
FIGS. 4-5 depict an exemplary sequence of graphical user interface (GUI) displays suitable for presentation on a display device in connection with the cursor management process of FIG. 3 in accordance with one or more exemplary embodiments.
Figure 4:
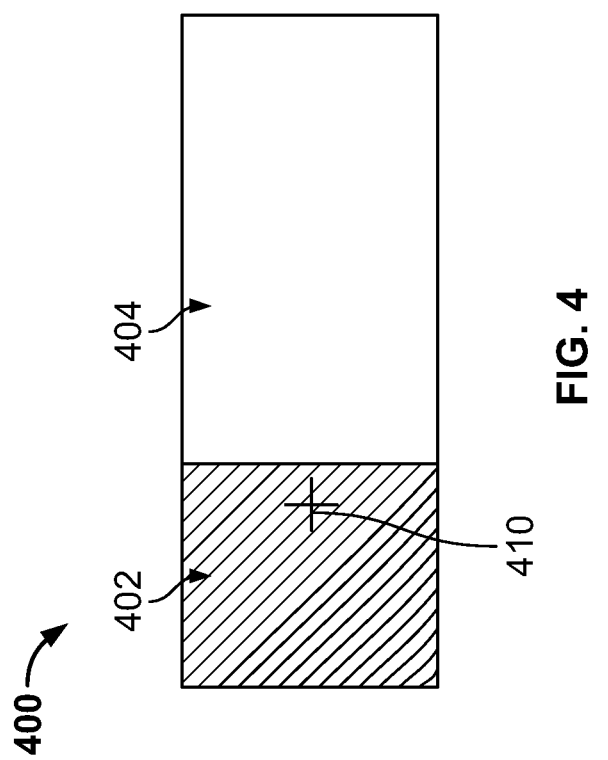

FIGS. 4-5 depict an exemplary sequence of display states 400, 500 depicting movement of a cursor 410, 510 across separate GUI displays 402, 404 associated with different software applications in connection with an exemplary implementation of the cursor management process 300 of FIG. 3. Referring to FIGS. 4-5 with continued reference to FIGS. 1-3, FIG. 4 depicts an initial state 400 of the display device(s) 206 after the user input management service 210 receives an initial message of a message stream from a user input device 202 that is associated with a user input having an initial user input location corresponding to the depicted location of the cursor 410 and assigns the message stream that is associated with the user input to the software application (e.g., software application 220) associated with a GUI display 402 (e.g., GUI display 230) encompassing or collocated with the initial location of the user input. As described above in connection with the cursor management process 300 of FIG. 3, after assigning the message stream to the software application (e.g., tasks 302, 304 and 306), the user input management service 210 provides corresponding instructions or other indicia to the associated software application 220 that indicates the initial location of the user input, the current state of the user input, that the user input is enabled or otherwise activated with respect to the associated software application 220, and that a cursor or other graphical indicator of the user input should be visible (or shown) with respect to the associated software application 220 (e.g., task 308). In response, the associated software application 220 renders, generates or otherwise provides a graphical representation 410 of the cursor at the location within its GUI display 402 that corresponds to the initial location of the user input indicated by the initial message of the associated message stream.

Referring now to FIG. 5, with continued reference to FIGS. 1-4, when the user input management service 210 detects one or more subsequent messages of the message stream from the user input device 202 that indicates an updated location of the user input that does not correspond to the GUI display 402 associated with its assigned software application, the user input management service 210 identifies a different software application 222 that is associated with a different GUI display 404 (e.g., GUI display 232) encompassing or collocated with the updated location of the user input as now being responsible for providing a graphical representation 510 of the cursor (e.g., tasks 310, 312). Thereafter, the user input management service 210 provides corresponding instructions or other indicia to the other software application 222 that indicates the updated location and current state of the user input and that the cursor corresponding to the user input should be visible with respect to the software application 222 (e.g., task 314), while also providing indication that the user input is disabled or otherwise deactivated with respect to that software application 222. As a result, the software application 222 generates, renders or otherwise provides a graphical representation 510 of the cursor at the location within its GUI display 404 that corresponds to the updated location of the user input indicated by the subsequent message(s) of the associated message stream but otherwise ignores the state of the user input, such that the presence of the user input within the region corresponding to its GUI display 404 does not engage or otherwise initiate any interactive features, elements or functionality of that software application 222. Concurrently, the user input management service 210 provides corresponding instructions or other indicia to the associated software application 220 that indicates the updated location and current state of the user input along with indication that the user input is enabled or otherwise activated with respect to the associated software application 220, but indicates that the cursor corresponding to the user input should be invisible, hidden or otherwise disabled with respect to the associated software application 220 (e.g., task 316). As a result, any interactive features, elements or functionality of the software application 220 that were initially engaged, triggered or otherwise initiated by the user input at the initial user input location may continue to respond to the user input in accordance with the updated user input location and the current state of the user input, while the software application 220 ceases rendering of the cursor 410 once the user input has moved outside its associated GUI display 402.

It should be noted that the GUI displays 402, 404 depicted in FIGS. 4-5 may be concurrently presented on a common or shared display device 206, while in other implementations, the GUI displays 402, 404 may not necessarily be on the same display device 206. For example, the GUI display 402 associated with a first software application 220 may be provided on a first cockpit display device 206, while the GUI display 404 associated with the second software application 222 may be provided on a second cockpit display device 206 that is separate and distinct from the first cockpit display device 206. In this regard, the user input management service 210 effectively provides a virtual transparent GUI display layer that is capable of spanning or otherwise overlying any and/or all display devices 206 and any and/or all corresponding software application GUI displays 230, 232, 234 provided thereon, thereby allowing user input to move across different applications 220, 222, 224, across GUI displays 230, 232, 234 and/or across different display devices 206 while maintaining intuitive responsive behaviors to the user input and providing intuitive cognitive feedback of the current location of the user input. For example, by virtue of the cursor management process 300, when a selection user input is received (e.g., a cursor button is pressed down) in one application, that application effectively captures the cursor, and the cursor remains associated with that application until all buttons associated with that cursor are released, even if the cursor is dragged outside the application. As another application becomes responsible for drawing the cursor, the cursor is marked as disabled or invalid with respect to that application, such that it does not interact with anything within that application.

It should be noted that in practice, applications can contain multiple controls that react to cursor-interactions, and applications (and GUI elements and controls) can host multiple cursors simultaneously and form a z-ordered hierarchy via the user input management service 210. For example, the background layer of an application GUI display can be assigned to the lowest level, GUI elements or controls on top of the background can be assigned to the next higher level, GUI elements or controls within another GUI element or control (e.g., context menus or the like) can be assigned to the next higher level, and so on. By assigning message streams to applications and particular GUI elements or controls (via the gesture recognizer of the assigned application), cursors that begin interaction in different GUI elements or controls are handled and processed separately from cursors that begin interactions in other GUI elements or controls, thereby enabling multiple different user inputs simultaneously. This also enables different interactive gestures, such as drag/translate, zoom/scale, route or the like to be performed by using multiple hardware cursors or tactile user inputs, while also allowing different users to simultaneously interact with the same application, GUI display and/or display device.

It will be appreciated that the subject matter described herein supports the use of dynamic areas that can be interacted with separately and displayed to an end user as supporting such interaction in an intuitive manner. In other words, instead of multiple user interactions happening at the coarse level of individual windows or GUI displays, the subject matter described herein supports subscribing to message streams at the fine-grained level of individual GUI elements or controls via the gesture recognizers associated with the respective GUI elements or controls. For example, a background GUI display layer of a particular application may have a gesture recognizer that covers its entire extent, while floating tiles or other GUI elements or controls in higher GUI display layers have their own gesture recognizers associated therewith. By virtue of the hierarchical arrangement supported by the user input management service 210, any user input or interaction that initiates within a particular GUI element or control that is in front of the background (e.g., by being above the background GUI display layer in the hierarchy) is captured by that gesture recognizer and does not have any effect on the underlying GUI display layers (or GUI elements or controls contained therein).

To avoid a series of tactile user inputs leading to the creation of multiple cursors, each active tactile user input is assigned its own touch cursor, and GUI elements or controls can be configurable to interact only with touch cursors (e.g., by filtering or ignoring other input from user input devices). For GUI elements or controls that are configurable to receive gestures, the tactile user inputs are analyzes to recognize a particular type of gesture and render the appropriate type of cursor corresponding to the detected gesture. Touch cursors and gesture cursors can exist simultaneously, with GUI elements or controls being configurable to interact with or otherwise respond to any combination of touch and gesture cursors. For example, for a GUI element or tile that features a touch only control may respond only to touch cursors while simultaneously allowing a gesture cursor on a gesture-recognizing portion of the GUI element or tile to do something else, thereby allowing a GUI element or control to have multiple interactive layers that support concurrent interactions with multiple cursors.

The subject matter described herein also supports backwards propagation to the subscribed application where the user interaction originated. For example, when a user interacts with a GUI element or control to bring up a menu or some other GUI element that would otherwise cause the cursor to "jump" to that element, the user input management service 210 converts or otherwise translates the cursor jump location to the appropriate coordinate location and provides appropriate instructions to the subscribed application and/or another application where the cursor has jumped to/from to ensure the location of the depicted cursor on the GUI display jumps in the desired manner while also ensuring the originally subscribed application continues to respond to subsequent user interaction.

To briefly summarize, the user input management service 210 and the cursor management process 300 cooperatively provide an intuitive and predictable way for different users to interact with a map or other content displayed on a touchscreen display, thereby reducing errors and frustration, which also improves situational awareness and pilot performance by increasing time on task. For example, a pilot or other user trying to pan a navigational map GUI display to view a desired geographical region may move the cursor or user input outside the boundaries of the navigational map GUI display while the navigational map GUI display continues to pan, rather than terminating the panning of the navigational map GUI display once the cursor or user input reaches the boundary of the navigational map GUI display. For example, a pilot or other user can pan the navigational map in a continuous motion or gesture that extends beyond the boundary or visible extent of the navigational map GUI display, rather than having to perform a sequence of motions or gestures by moving the cursor to the edge of the display before repositioning the cursor to the opposing side of the display and repeating, thereby reducing pilot workload and head-down time. Moreover, a co-pilot or other user may concurrently interact with other interactive features, elements or functionality associated with the navigational map display application, or with interactive features, elements or functionality associated with other GUI displays presented on the same display device (e.g., adjacent to the navigational map GUI display).

In practice, message streams for user interactions can become quite voluminous, for example, generating fifty to one hundred or more events per second, depending on the particular user input device and configuration. Due to limited buffer sizes, bus congestion, operating system limitations, packet collisions or other factors, delivery of messages encompassing all user interaction events may be unreliable. In implementations where multi-touch gestures are supported or otherwise accepted by the software application that is the subject of the user input, if the end of a user interaction is not detected or communicated to the software application, a subsequent user interaction associated with a subsequent or separate user input from the user's perspective may be treated as a continuation of a previous gesture at the software application, leading to an incorrect and nonintuitive gesture interpretation from the perspective of an end user. For example, if the "touch up" or other end event for a touch is not received by the targeted destination software application that supports a multi-touch zoom or rotate gesture, subsequent "touch down" or "touch move" events will be interpreted as a continuation of the multi-touch zoom or rotate gesture, producing the incorrect and undesired response at the software application. The problem of missing or lost user interaction events is exacerbated when the display system supports multiple concurrent user interactions, across different types and combinations of user input devices, across different types and combinations of display devices and software applications with corresponding GUI displays presented thereon. In this regard, FIG. 6 depicts an exemplary incomplete interaction recovery process 600 suitable for implementation by the user input management service 210 in the display system 200 of FIG. 2 to maintain intuitive and predictable behavior and recover from lost user interaction events.

The various tasks performed in connection with the illustrated process 600 may be implemented using hardware, firmware, software executed by processing circuitry, or any combination thereof. In practice, portions of the incomplete interaction recovery process 600 may be performed by different elements of the aircraft system 100 and/or the display system 110, 200. That said, for purposes of explanation, the incomplete interaction recovery process 600 may be described herein primarily in the context of an implementation by or at the user input management service 210 associated with the display system 110, 200. Additionally, for purposes of explanation, the incomplete interaction recovery process 600 may be described herein in the context of an implementation in connection with the cursor management process 300 of FIG. 3; however, it should be appreciated that the incomplete interaction recovery process 600 is not limited to use with the cursor management process 300 and may be separately implemented in an independent or standalone manner. It should also be appreciated that the incomplete interaction recovery process 600 may include any number of additional or alternative tasks, the tasks need not be performed in the illustrated order and/or the tasks may be performed concurrently, and/or the incomplete interaction recovery process 600 may be incorporated into a more comprehensive procedure or process having additional functionality not described in detail herein. Moreover, one or more of the tasks shown and described in the context of FIG. 6 could be omitted from a practical embodiment of the incomplete interaction recovery process 600 as long as the intended overall functionality remains intact.

Figure 6:
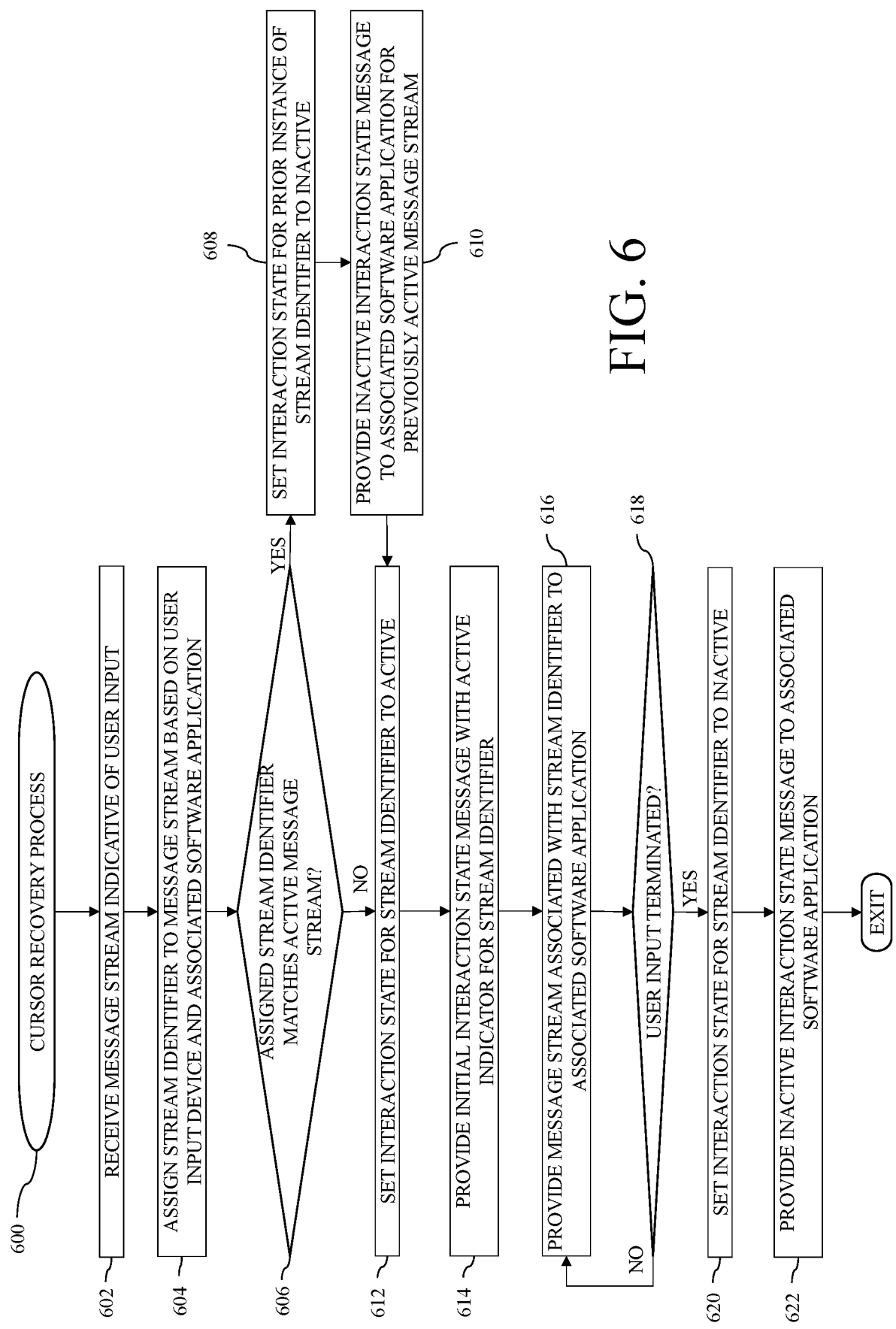
FIG. 6 depicts an exemplary incomplete interaction recovery process suitable for implementation by the display system of FIG. 2 in one or more exemplary embodiments.

Referring to FIG. 6 with continued reference to FIGS. 1-3, in exemplary embodiments, the incomplete interaction recovery process 600 is initiated or otherwise performed when a new message stream for a user input is received from a user input device (task 602). For example, a user providing a tactile user input to a touchscreen or similar tactile user input device 202 results in the user input device 202 transmitting or otherwise providing a message stream to the processing system 204 that begins with an initial touch down message or another message that indicates the start of a user input event or other user interaction, followed by subsequent messages responsive to the tactile user input that are continually transmitted or otherwise provided as a continuous stream of messages until the user ceases providing the tactile user input. In addition to including an indication of a touch down event or similar initiation of the respective user input gesture, the messages may also include an indication of the source of the user input (e.g., a unique identifier assigned to the respective user input device 202) along with other indicia for differentiating the user input (e.g., an identifier assigned and utilized by the user input device 202 to disambiguate or differentiate concurrent user inputs from one another). Similarly, user interaction with a mouse, CCD or another similar user input device 202 may similarly result in a message stream that begins with an initial message that indicates the start or initiation of the respective user interaction along with other identification information assigned to the respective user input.

In response to receiving an initial message of a message stream, the incomplete interaction recovery process 600 continues by automatically assigning an input tracking identifier to the respective message stream based on the source of the respective message stream and the respective software application assigned with responding to the message stream based on where the respective user input originated (task 604). In this regard, the user input management service 210 generates the input tracking identifier to identify the particular combination of user input device 202 and display software application 220, 222, 224 that is being interacted with by the respective user input, and then utilizes the input tracking identifier to track or otherwise monitor the user inputs that are currently active. For example, in one or more implementations, the user input management service 210 generates the input tracking identifier by concatenating or otherwise combining an identifier associated with the user input device 202 with a name or other identifier associated with the respective software application 220, 222, 224 being interacted with, followed by an instance number to differentiate multiple instances of the same application 220, 222, 224 that may be executing or run concurrently. Additionally, in some implementations, where a cursor is being created or rendered in an overlaid application, an identifier associated with the cursor may be appended to the input tracking identifier when a create-cursor request is transmitted to the overlaid application. In one or more implementations, the user input management service 210 implements or otherwise maintains a table or similar structure that maintains an association between an assigned input tracking identifier, a cursor identifier associated with the respective user input and corresponding cursor characteristics (e.g., the position, shape, visibility, etc.) for the associated cursor along with a respective interaction state associated with the respective input tracking identifier, and a respective sequence number assigned to the respective input tracking identifier to differentiate successive user inputs having a common assigned input tracking identifier.

Prior to communicating the message stream to the assigned software application, the incomplete interaction recovery process 600 verifies or otherwise confirms that the assigned input tracking identifier does not match or otherwise correspond to a previous or preexisting user input that is currently active (task 606). For example, the user input management service 210 may identify whether the table or other data structure includes an entry having the same input tracking identifier and a preceding sequence number that has an associated interaction state of active. In this regard, when a preceding user input having the same input tracking identifier is currently designated as active, the incomplete interaction recovery process 600 terminates or otherwise deactivates the preceding user input by setting its interaction state to inactive and transmits or otherwise provides a corresponding user interaction state message to the assigned software application that indicates an inactive interaction state for the preceding user input (tasks 608, 610). In response to receiving the inactive interaction state message from the user input management service 210, the software application 220, 222, 224 that was previously responding to the preceding user input may terminate the preceding user input or otherwise cease responding to the preceding user input before acting upon or otherwise responding to the message stream for the current user input. Thus, in a scenario where a touch up event or other event terminating a preceding user input is lost or is otherwise not received by the user input management service 210, the user input management service 210 notifies the appropriate software application 220, 222, 224 to enable the respective software application 220, 222, 224 to recover from the preceding user input by terminating any actions or functionality that was responsive to the preceding user input prior to responding to the current user input.

After terminating the preceding user input having the matching input tracking identifier, the incomplete interaction recovery process 600 sets or otherwise designates the interaction state for the current instance of user input with that assigned input tracking identifier to active and then transmits or otherwise provides a corresponding user interaction state message to the assigned software application that indicates an active interaction state for a new user input (tasks 612, 614). In this regard, when a respective software application 220, 222, 224 receives an active interaction state message from the user input management service 210 while a preceding user input having the same input tracking identifier is still considered active at the respective software application 220, 222, 224, the respective software application 220, 222, 224 may terminate the preceding user input in a similar manner as described above in the context of the inactive interaction state message. In this manner, in the event that an inactive interaction state message between the user input managements service 210 and the respective software application 220, 222, 224 is lost or otherwise missing, the respective software application 220, 222, 224 may utilize the active interaction state message to automatically terminate the preceding user input at the respective software application 220, 222, 224.

After providing the active interaction state message to the appropriate destination software application that is the target of the user input, the incomplete interaction recovery process 600 continues by transmitting, communicating or otherwise providing the message stream associated with that input tracking identifier to its assigned destination software application until the user input is terminated (tasks 616, 618). After providing the initial active interaction state message to the assigned software application 220, 222, 224, the user input management service 210 streams the message stream from the user input device 202 to the assigned software application 220, 222, 224 in a similar manner as described above in the context of FIGS. 1-5 and the cursor management process 300 of FIG. 3. In exemplary implementations, the assigned input tracking identifier is not transmitted, provided or otherwise included with subsequent messages of the message stream after the initial activation message, since individual messages from the user input device 202 include (e.g., in a message header) indication of the source of the user input (e.g., a unique identifier assigned to the respective user input device 202) and other indicia for differentiating the user input at the user input device 202, as described above, along with payload information identifying the location or other attributes characterizing the current, real-time state of the user input. Thereafter, when the user stops interacting with the user input device, the user input device 202 transmits or otherwise provides a final touch up message or another message that indicates the end of the user input event or other user interaction.

In response to receiving the final message of a message stream, the incomplete interaction recovery process 600 continues by automatically setting or updating the interaction state associated with the input tracking identifier assigned to the respective message stream to the inactive state and transmits or otherwise provides a corresponding user interaction state message to the assigned software application that indicates an inactive interaction state for the user input (tasks 620, 622). In this regard, the user input management service 210 updates the appropriate entry in the table or other structure utilized to monitor the active user inputs to indicate an inactive state for the entry associated with the respective input tracking identifier and sequence number, such that a subsequent user input having the same message input tracking identifier can be immediately provided to the destination software application (e.g., at 606) without requiring the preceding user input to be cleared. In a similar manner as described above (e.g., at 610), in response to receiving the inactive interaction state message from the user input management service 210, the software application 220, 222, 224 that was previously responding to the user input may terminate the user input or otherwise cease responding to the user input.

Referring to FIGS. 2-5 with continued reference to FIG. 6, the incomplete interaction recovery process 600 allows for multiple concurrent user inputs and corresponding cursors to move across different GUI displays, software applications and/or display devices while avoiding nonintuitive, aberrant or otherwise undesirable behavior when a message indicating the termination of a user input is lost, missing or otherwise not received by the user input management service 210 and/or the software application(s) 220, 222, 224. For example, as described above in the context, in response to receiving an initial touch down event message associated with a tactile user input represented by cursor position 410, the user input management service 210 assigns an input tracking identifier to the user input based on the tactile user input device 202 that is the source of the tactile user input and the targeted destination software application 220 associated with that region of the GUI display 402 (e.g., tasks 602, 604). Thereafter, the user input management service 210 provides a corresponding active interaction state indicator to the targeted destination software application 220 (e.g., task 614) prior to streaming or otherwise providing the message stream associated with the tactile user input from the tactile user input device 202 to the targeted destination software application 220 (e.g., task 616) with indicia that the software application 220 should respond to the tactile user input (e.g., tasks 308, 316). In response to receiving a touch up event message from the tactile user input device 202, the user input management service 210 updates the interaction state associated with the tactile user input to inactive before providing a corresponding inactive interaction state message to the targeted destination software application 220 to revert the targeted destination software application 220 to a noninteractive state awaiting user interaction (e.g., task 622). Additionally, the user input management service 210 ceases providing instructions to the other software application 222 that are configurable to cause the other software application 222 to remove or otherwise cease drawing the graphical representation of a cursor 510 for a tactile user input that no longer exists.

In scenarios where the touch up event message from the tactile user input device 202 is not received by the user input management service 210, the incomplete interaction recovery process 600 operates to prevent the applications 220, 222 from responding to a subsequent tactile user input as a continuation of the preceding tactile user input where the touch up event was not received. For example, with reference to FIGS. 4-5, in response to receiving a subsequent touch down event message from the tactile user input device 202 that is within the GUI display 402 associated with the previously targeted destination software application 220, the user input management service 210 automatically assigns the same input tracking identifier to the subsequent tactile user input while incrementing the sequence number to be assigned to the subsequent tactile user input (e.g., tasks 602, 604). Based on the subsequent tactile user input having the same input tracking identifier and subsequent sequence number, the user input management service 210 utilizes the table or other data structure for tracking active user inputs to identify any preceding tactile user inputs assigned the same input tracking identifier but having an earlier sequence number. When the user input management service 210 identifies the preceding tactile user input having the same input tracking identifier and earlier sequence number but an active interaction state indicator, the user input management service 210 determines the touch up event or other event terminating the preceding tactile user input was missed (e.g., task 606).

In response to detecting the absence of a termination event for the preceding tactile user input, the user input management service 210 automatically updates the state of that preceding tactile user input to inactive and provides a corresponding inactive interaction state message to the targeted destination software application 220 to terminate the response to the preceding tactile user input (e.g., tasks 608, 610). This, in turn, allows the targeted destination software application 220 to terminate any prior response(s) to the preceding tactile user input and revert to a normal or default non-interacted state prior to receiving the message stream for the subsequent tactile user input (e.g., tasks 612, 614, 616). In this manner, the inactive interaction state message provided by the user input management service 210 prevents the targeted destination software application 220 from interpreting the subsequent user input as a continuation of the preceding tactile user input, for example, by inhibiting or preventing a multi-touch gesture from being performed by the software application 220 in response to what the user intends and perceives as successive, independent and discrete tactile user inputs. For example, if the user was attempting to pan a navigational map GUI display 402 (e.g., by moving the cursor from position indicated by cursor 410 to the position indicated by cursor 510) and then select an element or feature on the navigational map after panning, the subsequent selection input with respect to the navigational map GUI display 402 is not interpreted as invoking a multi-touch gesture (e.g., to zoom or rotate the navigational map), thereby preventing user frustration and maintaining coherent and intuitive operation of the navigational map software application 220.

With continued reference to FIGS. 4-5, it should be noted that the incomplete interaction recovery process 600 also allows the other application 222 to respond to a subsequent tactile user input that it is the subject of independent of the preceding tactile user input in scenarios where the touch up event message from the tactile user input device 202 is not received by the user input management service 210 for the preceding tactile user input. For example, in response to receiving a subsequent touch down event message from the tactile user input device 202 that is within the GUI display 404 associated with the other software application 222, the user input management service 210 automatically assigns a different input tracking identifier to the subsequent tactile user input based on the other software application 222 being the targeted destination software application rather than the previously targeted software application 220. Since the input tracking identifier assigned to a subsequent tactile user input with respect to the GUI display 404 of the other application 222 differs from the input tracking identifier assigned to the preceding tactile user input associated with the GUI display 402 of the original application 220, the user input management service 210 sets the interaction state for the message stream to active and provides a corresponding active interaction state indicator to the targeted destination software application 222 (e.g., tasks 612, 614), thereby allowing the other application 222 to respond to the more recently initiated tactile user input with respect to its GUI display 404.

In one or more implementations, the assigned input tracking identifier (e.g., at 604) is the same for message streams emanating from a single user input device and software application directly receiving those inputs, such that a touchscreen displaying multiple different software applications will result in a different input tracking identifier for tactile user inputs received by different software applications. In implementations where the user input management service 210 effectively provides a virtual transparent overlay GUI display for managing cursors across different applications, the user input management service 210 assigns a nonnegative integer cursor identifier to a respective cursor and appends the cursor identifier to the input tracking identifier (e.g., the name or identifier of the user input management service 210 and a sequence or instance number) when providing a create-cursor request to an underlying software application. The assigned cursor identifier may be utilized by the user input management service 210 to index or track the active cursors, where each cursor identifier is maintained in association with its input tracking identifier and the cursor characteristics (e.g., position, shape, visibility, etc.) and interaction state associated with the respective cursor. In this regard, a separate input tracking identifier may be created (e.g., by concatenating the name or identifier of the underlying software application with a sequence or instance number) for the create-cursor request and corresponding cursor to be drawn by the underlying software application, with the cursor identifier being utilized to index and maintain an association between the initial input tracking identifier associated with the user input management service 210 and the input tracking identifier associated with the underlying software application drawing the corresponding cursor pursuant to instructions from the user input management service 210.

Thereafter, when a subsequent user interaction having the same input tracking identifier occurs with respect to either the user input management service 210 or the underlying software application or a cursor with the same input tracking identifier is dragged into the GUI display associated with either the user input management service 210 or the underlying software application, the incomplete interaction recovery process 600 automatically detects the matching input tracking identifier and cleans up or otherwise terminates the prior cursor being generated and/or responded to by the underlying software application by setting the interaction state for the prior instance of that input tracking identifier to inactive. Setting the interaction state to inactive removes the rendering of the cursor by the underlying software application but also disables any effects the previous user interaction (e.g., an active gesture, a touch down, a button press and/or the like) may have had. In this regard, if the prior user interaction with the same input tracking identifier did not end properly in the underlying software application, a subsequent user interaction with the virtual transparent overlay GUI display associated with the user input management service 210 may result in a subsequent message stream with the common input tracking identifier, which in turn, causes the user input management service 210 to clean up or otherwise terminate the prior user interaction with the underlying software application before responding to the new user interaction.

It should be noted that the incomplete interaction recovery process 600 maintains coherent and intuitive operation when a touch up event or other user input termination event is received by the user input management service 210 but does not propagate to or is otherwise not received by the targeted destination software application 220, 222, 224. For example, similar to the user input management service 210, a software application 220, 222, 224 may utilize the user interaction state messages from the user input management service 210 to separately monitor or track the currently active user inputs it is responding to and/or drawing cursors for. When a software application 220, 222, 224 fails to receive an interactive interaction state message from the user input management service 210 (e.g., tasks 610, 622) but subsequently receives an active interaction state message for another message stream having common input tracking identifier, the software application 220, 222, 224 may automatically determine to deactivate or otherwise terminate the response to the preceding user input prior to initiating a response to the subsequent message stream.

When a targeted destination software application 220, 222, 224 receives the active interaction state message, any existing user interactions having an input tracking identifier that matches the current input tracking identifier associated with the active interaction state message can be considered to have ended, and therefore, can be terminated by the targeted destination software application 220, 222, 224. In exemplary implementations, the sequence number associated with the respective user inputs is utilized to verify or otherwise confirm that a respective user input can be deactivated prior to the targeted destination software application 220, 222, 224 deactivating the respective user input. For example, a create cursor request may be sent under a previous sequence number, where the sequence number is incremented and assigned to a subsequent user input using the created cursor (e.g., after the user input device 202 receives a cursor-in-scope response to its create-cursor message). Accordingly, some implementations may preserve a preceding user input having the same assigned input tracking identifier until the current sequence number associated with that input tracking identifier is at least a threshold number (e.g., at least two) successive to the sequence number assigned to the preceding user input to account for touch gestures or other streams of cursor-based user interactions, while other user inputs may be cleaned up (e.g., sequential touch events that are combined to produce a gesture event) as soon as a different sequence number is identified.

In one or more implementations, inactive interaction state messages may be logged or otherwise maintained by or at a respective software application 220, 222, 224 or the user input management service 210 for debugging. For example, if there are multiple active user inputs at the respective software application 220, 222, 224 having the same input tracking identifier but different sequence numbers when an inactive interaction state message is received for one instance of that input tracking identifier, it may be more likely that the remaining active user inputs at the respective software application 220, 222, 224 are attributable to bugs or other anomalies at the respective software application 220, 222, 224 rather than inactive interaction state messages being lost at runtime, which, in turn, allows for a developer to analyze the respective software application 220, 222, 224 for potential logic errors or other problems.

For the sake of brevity, conventional techniques related to graphical user interfaces, graphics and image processing, touch sensing, touchscreens, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of resolving user input, the method comprising:
   assigning a first identifier to a first stream of messages from a user input device corresponding to a first user input with respect to an application, wherein the first identifier is associated with a first source of the first user input associated with the first stream of messages; and
   while a user interaction state associated with the first stream of messages is active:
      assigning a second identifier to a second stream of messages from the user input device, wherein the second identifier is associated with a second source of a second user input associated with the second stream of messages; and
      in response to detecting the second identifier corresponds to the first identifier, deactivating the first stream of messages associated with the first stream of messages, wherein deactivating the first stream of messages results in the application responding to the second stream of messages corresponding to the second user input.

2. The method of claim 1, wherein deactivating the first stream of messages comprises providing an inactive interaction state message to the application including the first identifier and an inactive state indicator prior to providing the second stream of messages to the application.

3. The method of claim 2, wherein a first message of the second stream of messages comprises an active interaction state message including the second identifier and an active state indicator.

4. The method of claim 1, further comprising determining the first identifier to assign to the first stream of messages based at least in part on the user input device and the application associated with a user interface region corresponding to a location associated with an initial message of the first stream of messages.

5. The method of claim 4, wherein a second location associated with an initial message of the second stream of messages corresponds to the second user input within the user interface region associated with the application.

6. The method of claim 1, wherein deactivating the first stream of messages results in the application terminating an action responsive to the first user input.

7. The method of claim 1, wherein deactivating the first stream of messages results in the application removing a graphical representation of a cursor associated with the first user input.

8. The method of claim 1, wherein deactivating the first stream of messages results in the application rendering a graphical representation of a cursor associated with the second user input.

9. A non-transitory computer-readable medium having computer-executable instructions stored thereon that, when executed by a processing system, cause the processing system to:
   assign a first identifier to a first stream of messages from a user input device corresponding to a first user input with respect to an application, wherein the first identifier is associated with a first source of the first user input associated with the first stream of messages; and
   while a user interaction state associated with the first stream of messages is active:
      assign a second identifier to a second stream of messages from the user input device, wherein the second identifier is associated with a second source of a second user input associated with the second stream of messages; and
      in response to detecting the second identifier corresponds to the first identifier, deactivate the first stream of messages associated with the first stream of messages, wherein deactivating the first stream of messages results in the application responding to the second stream of messages corresponding to the second user input.

10. The non-transitory computer-readable medium of claim 9, wherein the computer-executable instructions cause the processing system to deactivate the first stream of messages by providing an inactive interaction state message to the application including the first identifier and an inactive state indicator prior to providing the second stream of messages to the application.

11. The non-transitory computer-readable medium of claim 10, wherein a first message of the second stream of messages comprises an active interaction state message including the second identifier and an active state indicator.

12. The non-transitory computer-readable medium of claim 9, wherein the computer-executable instructions cause the processing system to determine the first identifier to assign to the first stream of messages based at least in part on the user input device and the application associated with a user interface region corresponding to a location associated with an initial message of the first stream of messages.

13. The non-transitory computer-readable medium of claim 12, wherein a second location associated with an initial message of the second stream of messages corresponds to the second user input within the user interface region associated with the application.

14. The non-transitory computer-readable medium of claim 9, wherein deactivating the first stream of messages results in the application removing a graphical representation of a cursor associated with the first user input.

15. The non-transitory computer-readable medium of claim 9, wherein deactivating the first stream of messages results in the application rendering a graphical representation of a cursor associated with the second user input.

16. A system comprising:
   a user input device to provide a message stream associated with a user input;
   one or more display devices; and
   a processing system coupled to the user input device and the one or more display devices, wherein the processing system is configurable to implement a user input management service to:
      assign a first identifier to a first stream of messages from the user input device corresponding to a first user input with respect to an application, wherein the first identifier is associated with a first source of the first user input associated with the first stream of messages; and
      while a user interaction state associated with the first stream of messages is active:
         assign a second identifier to a second stream of messages from the user input device, wherein the second identifier is associated with a second source of a second user input associated with the second stream of messages; and in response to detecting the second identifier corresponds to the first identifier, deactivate the first stream of messages associated with the first stream of messages, wherein deactivating the first stream of messages results in the application responding to the second stream of messages corresponding to the second user input.

17. The system of claim 16, wherein deactivating the first stream of messages comprises the user input management service providing an inactive interaction state message to the application including the first identifier and an inactive state indicator prior to providing the second stream of messages to the application.

18. The system of claim 17, wherein a first message of the second stream of messages comprises an active interaction state message including the second identifier and an active state indicator.

19. The system of claim 16, wherein the user input management service determines the first identifier to assign to the first stream of messages based at least in part on the user input device and the application associated with a user interface region corresponding to a location associated with an initial message of the first stream of messages.

20. The system of claim 16, wherein a second location associated with an initial message of the second stream of messages corresponds to the second user input within a user interface region associated with the application.

* * * * *